United States Patent [19]
White-Wexler et al.

[11] Patent Number: 5,501,040
[45] Date of Patent: *Mar. 26, 1996

[54] TERRACED PLANTER

[76] Inventors: Kimberly L. White-Wexler; Richard T. Wexler, both of 590 Berkley St., Berkley, Mass. 02779

[*] Notice: The term of this patent shall not extend beyond the expiration date of Pat. No. 5,444,940.

[21] Appl. No.: 345,995

[22] Filed: Nov. 29, 1994

Related U.S. Application Data

[63] Continuation of Ser. No. 107,514, Aug. 17, 1993, Pat. No. 5,449,940.
[51] Int. Cl.$^6$ .................................................. A01G 25/00
[52] U.S. Cl. ............................ 47/82; 47/83; 47/66; 47/71
[58] Field of Search ...................... 47/82, 83, 71, 47/66 C, 87, 85

[56] References Cited

U.S. PATENT DOCUMENTS

| | | |
|---|---|---|
| 53,477 | 3/1866 | Perry . |
| D. 140,082 | 1/1945 | Hathaway . |
| 440,141 | 11/1890 | Dearborn . |
| 3,528,584 | 9/1970 | Piccirilli . |
| 4,204,367 | 5/1980 | Cone . |
| 4,553,352 | 11/1985 | Powell et al. . |
| 4,899,487 | 2/1990 | Brownlee . |

FOREIGN PATENT DOCUMENTS

| | | |
|---|---|---|
| 1000377 | 2/1952 | France . |
| 453616 | 2/1977 | German Dem. Rep. . |
| 0280025 | 6/1990 | Germany . |
| 0046981 | 4/1977 | Japan . |

Primary Examiner—Terry Lee Melius
Assistant Examiner—Joanne C. Downs

[57] ABSTRACT

A decorative, terraced planter provides separate plant beds in individual compartments defined within an integrally formed housing of rigid, unitary construction. Each compartment can hold plants and soil separately from those in the other compartments, so that a mix of plants having differing soil and watering needs can be grown together within the planter. The compartments have holes at their bottoms to permit excess water to escape, and the planter preferably has a drip pan beneath the housing to catch the excess water. Stand-offs between the housing and the drip pan permit evaporation of water from the drip pan. Preferably, the tops of the compartments are at different levels, so as to form tiers or rows of plant beds, one above another, much like those of a hillside, terraced garden.

11 Claims, 5 Drawing Sheets

TERRACED PLANTER

This is a continuation of U.S. patent application Ser. No. 08/107,514, filed on Aug. 17, 1993, now U.S. Pat. No. 5,449,940.

BACKGROUND OF THE INVENTION

A. Field of the Invention

This invention relates generally to a portable planter in which plants that require different soil and watering conditions can be grown in an aesthetically pleasing arrangement.

B. Description of the Related Art

As used herein, a "planter" is a decorative pot, box or other container in which plants are grown for ornamental purposes. Conventional planters can be used for growing diverse types of plants; however, some combinations of plants do not fair well when grown together in individual conventional planters. Reasons for this include the plants' different needs, such as soil types (e.g., drainage and moisture-holding characteristics), watering schedules, etc.

For example, cactus, ivy and ferns heretofore have been only grown successfully in separate planters. The cactus require sandy soil with infrequent watering, while the ferns thrive in rich potting soil with abundant watering. Those plants are simply not sufficiently compatible to grow in the same plant bed. Arrangements of such plants have best been achieved by clustering separate planters, and, optionally, filling the space between the planters with peat moss, stone or other such coarse material.

Unfortunately, the use of multiple planters in that approach limits the aesthetic arrangement of the plants, and leaves the resulting assembly not easily portable. Portability is often important because plant arrangements often need to be moved, e.g., to areas that receive more or less direct sunshine.

Moreover, portability is important to allow a planter to be a convenient article of commerce, e.g., to permit a customer to "pick-up" a planter containing professionally arranged greenery or live floral arrangements, e.g., at a retail store, garden center or flower shop, and transport it without requiring assistance. Also, portable planters are typically more compact, and that can be particularly advantageous for planters intended for use in apartments or wherever space is at a premium.

Accordingly, it would be desirable to provide a portable planter that would allow a mix of plants, which have differing soil and watering needs, to be grown together in a decorative container. While achieving these objectives, however, any solution should not compromise or limit the aesthetic values of the plant arrangement. In fact, it would be desirable to provide such a planter that extends, rather than limits, the spectrum of possible plant arrangements.

DESCRIPTION OF THE INVENTION

A. Summary of the Invention

The present invention resides in a terraced planter that provides separate plant beds in individual compartments defined within an integrally-formed housing of unitary construction. Each compartment can hold plants and soil separately from those in the other compartments, so that a mix of plants having differing soil and watering needs can be grown together within the planter. The compartments have holes at their bottoms to permit excess water to escape, and the planter preferably has a drip pan beneath the housing to catch the excess water. Stand-offs between the housing and the drip pan permit evaporation of water from the drip pan.

Preferably, the tops of the compartments are at different levels, so as to form tiers or rows of plant beds, one above another, much like those of a hillside, terraced garden. The housing and the compartments therein can be of any of various geometries, including oval, circular, rectangular, or square, to name a few. In fact, more complex geometries are within the purview of the invention, such as a pentagonal or stepped, ziggurat-like housing.

In furtherance of the invention's objective of conveying the impression of a hillside terraced garden, the highest compartment in the housing can be, e.g., the smallest in terms of the surface area of the plant bed defined thereby, so as to be reminiscent of the summit of the hill. The lower compartments can be successively more remote from that highest compartment and, e.g., can have successively larger bed surface areas, like terraces lower on a hill.

Accordingly, the invention provides an innovative landscape that permits one to grow all her or his favorite plants in a minimum of space. In addition, the different "levels" of the compartments allow the plant arranger to design in "height" as well as surface area of the plant beds in the planter, while using a diverse selection of plants. With such a large variety of shapes, levels, color and possible plant mixes, the invention promotes flexibility in all three dimensions of the plant arrangement. The invention also promotes creativity in the planters decorative design to enhance its overall horticultural and aesthetic qualities.

The invention should be distinguished from, e.g., starter containers in which seedlings are frequently grown for transplanting outdoors or to permanent containers. Such temporary containers often have multiple separate compartments, each sized for holding usually at most two seedlings. When the seedlings mature, one is pinched out, and, later, the remaining one is transplanted. Starter containers are typically of flimsy material, and are too small for plant arrangements because the roots of the plants would bind if not transplanted. Typically, also, a starter container holds the same type of soil and plant in each of its compartments.

In contradistinction to starter containers, the present invention relates to sturdy, firmly constructed, permanent containers which are used for decorative purposes. They are sized and configured to hold creative and ornamental arrangements of mature plants, which are not typically intended for transplantation.

A. BRIEF DESCRIPTION OF THE DRAWINGS

For a fuller understanding of the nature of the invention, reference should be had to the following detailed description taken in connection with the accompanying drawings, in which.

C. DETAILED DESCRIPTION OF THE INVENTION

Figure 1:
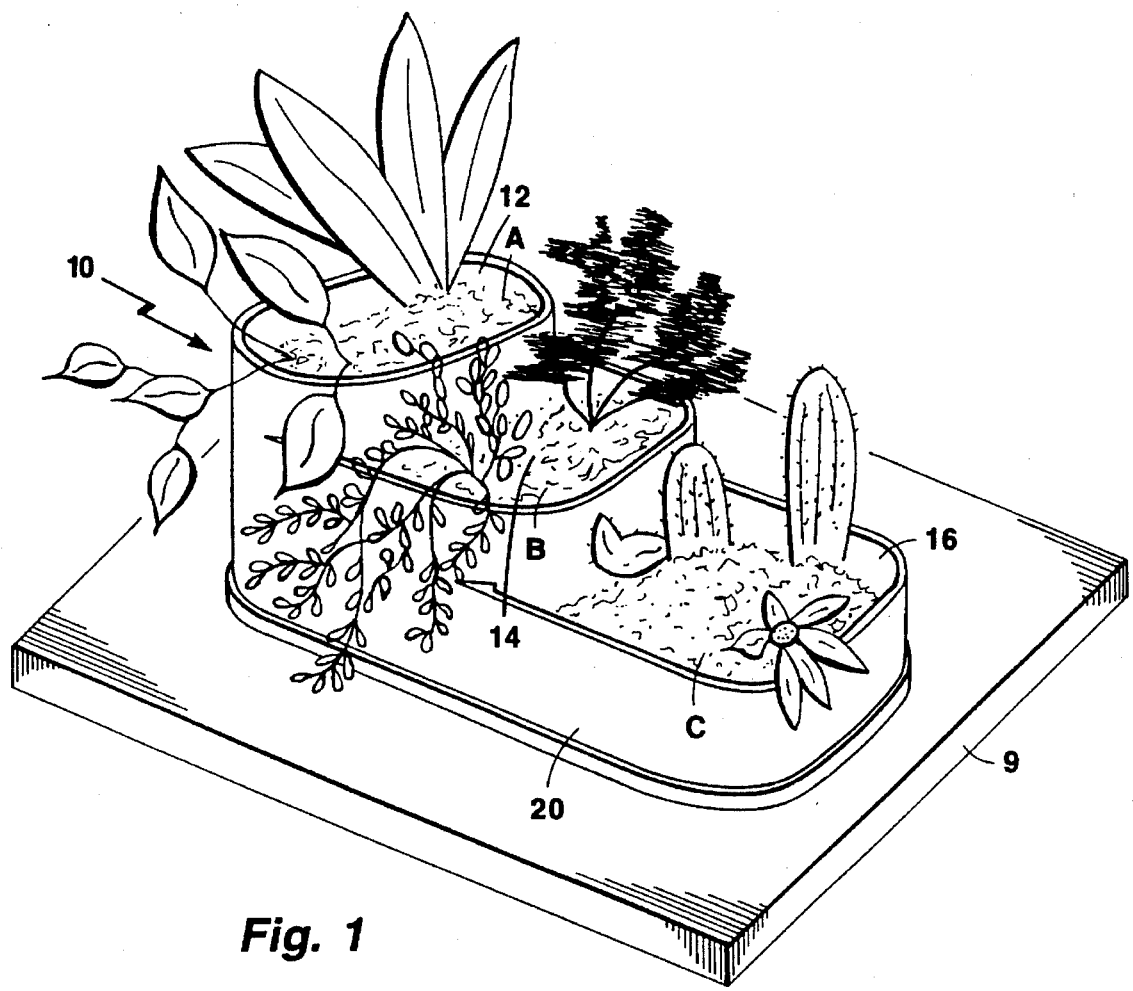
FIG. 1 is a perspective view of a terraced planter in accordance with an illustrative embodiment of the invention, containing an illustrative plant arrangement.

FIG. 1 shows a terraced planter 10 in accordance with an illustrative embodiment of the invention. The terraced planter 10 provides separate plant beds A, B, and C in individual compartments 12, 14, 16 defined within an integrally-formed, elongate housing 20 of rigid, unitary construction. Each compartment 12–16 can hold soil and one or more plants separately from those in the other compartments. The plants within each compartment 12–16 preferably have similar soil and watering needs, while the plants in different compartments 12–16 can have different soil and watering needs. Accordingly, a mix of plants having differing soil and watering needs can be grown together within the planter 10.

The compartments 12–16 of the planter 10 are preferably of different heights. In other words, the respective tops $T_1$–$T_3$ (see FIG. 4) of the compartments 12–16 are at successively lower heights, so as to provide tiers or rows of plant beds A–C, one below another, much like those of a hillside, terraced garden. As used herein, unless otherwise indicated, the term "height" is intended to denote the 'external' height of the compartments 12–16, or features thereof, as measured from the top of a support surface S on which the planter 10 rests.

Figure 2:
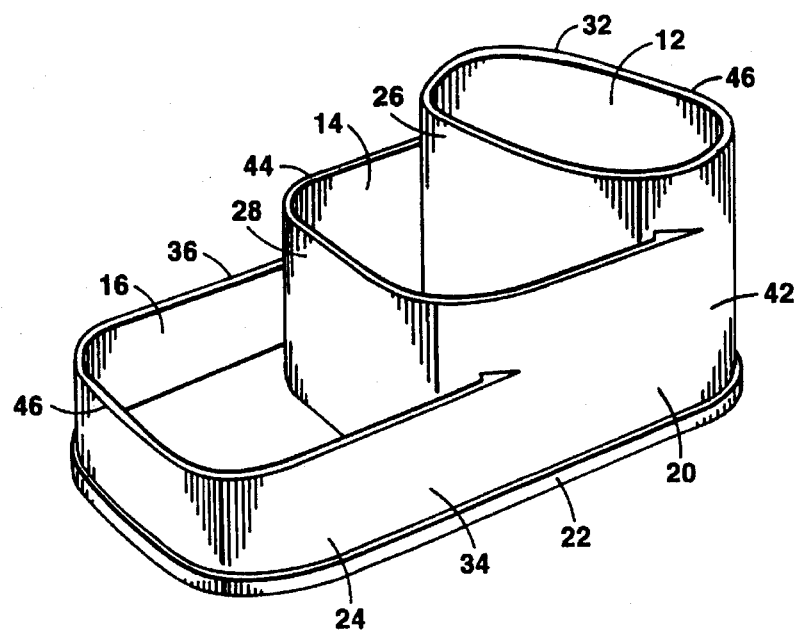
FIG. 2 is a enlarged, rotated, perspective view of the terraced planter of FIG. 1, without the plant arrangement.
Figure 3:
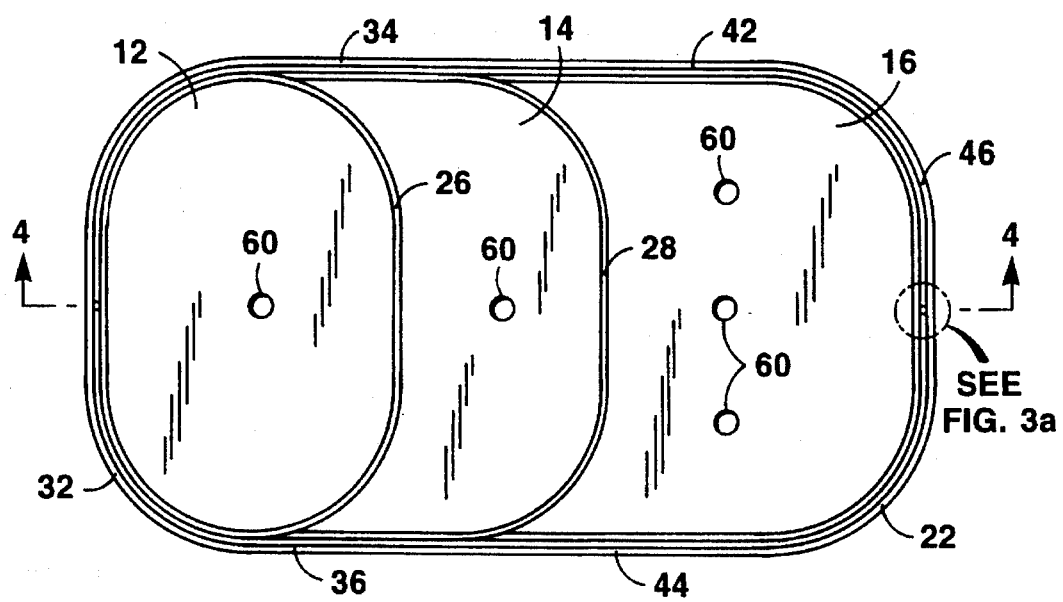
FIG. 3 is a top plan view of the terraced planter of FIG. 2.
Figure 4:
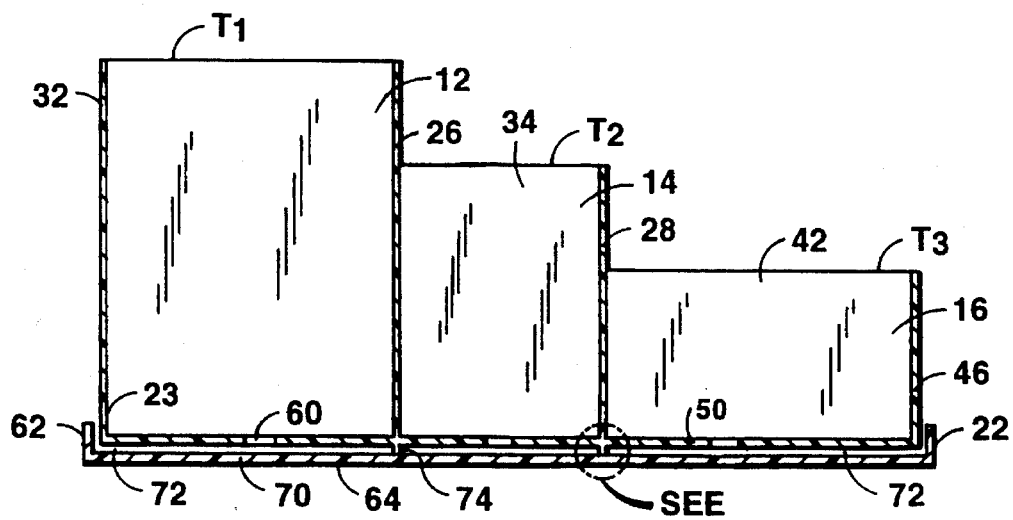
FIG. 4 is a cross-sectional view taken along line IV—IV of FIG. 3.

FIGS. 2–4 show the terraced planter 10 in more detail. The planter 10 consists of the housing 20 and a removable drip pan 22 that fits snugly over a bottom end 23 (FIG. 4) of the housing 20. The housing 20 is preferably integrally formed, e.g., by molding a plastic material such as ABS. The exterior of the housing 20 can have a decorative finish or texture. The housing 20 has a continuous, up-standing outer wall 24 and spaced, first and second, curvilinear, partition walls 26, 28 that separate the housing 12 into the compartments 12–16. The outer and partition walls 24–28 are preferably rigid and impermeable to water so as to seal the compartments 12–16 from one another.

The compartments 12–16 are disposed in a nested arrangement, with compartment 12 being ovalular shaped, and the other compartments 14–16 mimicking that shape, though more rectangular. Specifically, compartment 12 is located at a first end of the housing 20, and is formed by a first, generally "C" shaped portion 32 of outer wall 24 and first partition wall 26. The outer wall portion 32 and first partition wall 26 rise to about the same height, thus defining the top $T_1$ (FIG. 4) at their coterminous, distal ends.

Compartment 14 is adjacent to and intermediate the other compartments 12, 16, and is formed by the first and second partition walls 26, 28 and opposing, generally parallel, planar first side walls 34, 36 of the outer wall 24. As can best be seen in FIG. 4, the heights of the second partition wall 28 and the first side walls 34, 36 are about the same. Those walls define top $T_2$ (FIG. 4) at their coterminous distal ends, and are lower than the first partition wall 26.

Compartment 16 is located at a second or other end of the housing 20, and is formed by second partition wall 28, opposing, generally parallel, planar second side wall portions 42, 44 of the outer wall 24 (which are co-planar with the respective first portions 34, 36), and a second, generally "C" shaped portion 46 of outer wall 24. The heights of the outer wall portion 46 and the second side walls 42, 44 are about the same, define top $T_3$ (FIG. 4) at their coterminous distal ends, and are lower than the second partition wall 26.

As can be seen in FIG. 4, with the foregoing arrangement, the compartments 12–16 are formed as "steps" in the housing 20. Compartment 12 is the tallest, extending, e.g., about six inches (15 cm) to the top $T_1$. Compartment 14 is next tallest, extending, e.g., about four inches (10 cm) to the top $T_2$. Compartment 16 is the shortest, extending, e.g., about two inches (5 cm) to the top $T_3$. Tops $T_1$–$T_3$ of the compartments 12–16 are disposed, preferably, in parallel planes that intersect the outer wall 16 orthogonally.

As can be appreciated from FIG. 3, when viewed from the top, the housing 20 appears to have nested, pleasing oval-like design features, one within another, extending out from outer wall portion 32.

With reference to FIG. 4, the housing 20 also has a generally planar, bottom wall 50 that is parallel to the tops $T_1$–$T_3$ and wall 50 generally traverses or closes the outer wall 24 (FIG. 2) at the bottom of the planter 10. Since the housing bottom wall 50 is planar, the compartments 12–16 have 'internal' heights (measured from the housing bottom wall 50) that vary in accordance with the external heights of the compartments. This is not a significant disadvantage for the planter 10 because some plants, such as cactus, have shallower root structures than other plants, and do not require deep soil. Accordingly, plants such as cactus can be grown in the lower compartments 14–16, while other plants that require greater soil depths can be grown in the upper compartment 12, for example.

Alternatively, though not shown in the drawings, the housing bottom wall 50 can be "stepped" in the same manner as the tops $T_1$–$T_3$ so that all the compartments 12–16 will have the same internal height regardless of their external heights.

The bottom wall 50 has at least one small weep hole 60 in each compartment 12–16 that permits excess water to flow under the force of gravity out of the compartment and into the drip pan 22. Since the compartments 12–16 may require various degrees of drainage depending on the type of plants to be grown therein, the weep holes 60 can be of various sizes, or different compartments can have different numbers of weep holes 60.

Importantly, the weep hole or holes 60 at each compartment 12–16 provide for soil drainage independently of the drainage in each of the other compartments. This is consistent with the objective of the invention of growing plants with differing soil and watering needs in the separate compartments.

The drip pan 22 is of unitary construction, having an upstanding lip 62 extending about the circumference of a generally planar, solid bottom wall 64 so as to form a cup into which the housing bottom end 23 is removably received.

Figure 3A:
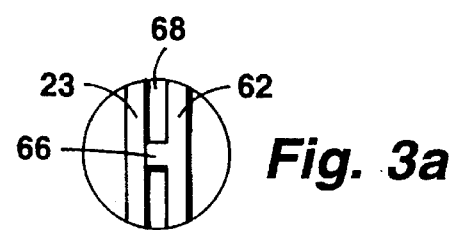
FIG. 3a is a fragmentary plan view of a standoff shown in FIG. 3.

As shown in detail in FIG. 3a, a plurality (e.g., four) of integrally formed, small tabs 66, called stand-offs, are circumferentially, preferably-equally spaced around the upstanding lip 62, and extend inwardly to maintain a small gap 68 between the housing bottom end 23 and the lip 62. The gap 68 permit evaporation of water from the drip pan 22.

Figure 4A:
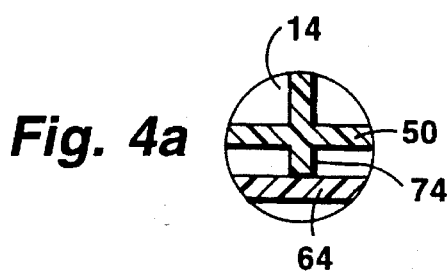
FIG. 4a is a fragmentary sectional view of a cross-rib shown in FIG. 4.

As shown in FIG. 4, to provide a space 70 in the drip pan 22 for water collection, the housing bottom wall 50 is provided with a plurality of descending, integrally-formed ribs 72, 74. An oval-shaped first rib 72 extends about the perimeter of the housing bottom wall 50 immediately beneath the outer wall 24. In addition, and as shown in detail in FIG. 4a, there are cross-ribs 74 beneath the partition walls 26, 28.

D. ALTERNATIVE EMBODIMENTS

Figure 5:
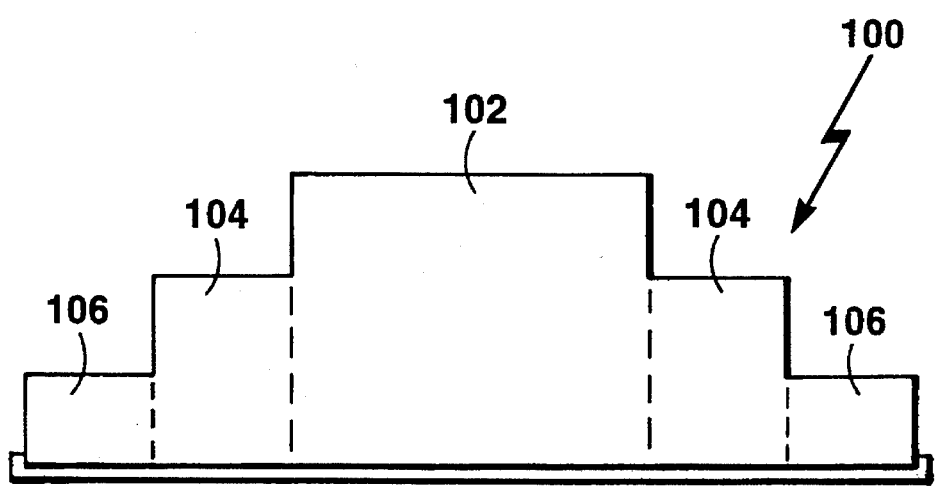
FIGS. 5 and 6 are elevational and top plan views of a terraced planter in accordance with an alternative embodiment of the invention.
Figure 6:
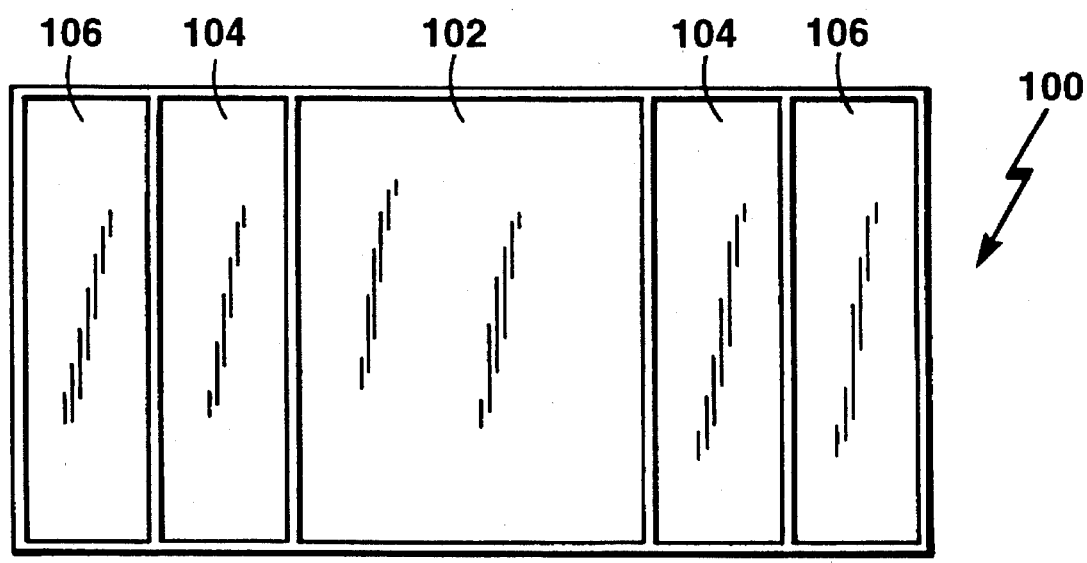

FIGS. 5 and 6 show a terraced planter 100 in accordance with an alternative embodiment of the invention. The planter 100 has an elongate, ziggurat-like shape. It has a central, highest, square-shaped, first compartment 102, a pair of rectangular, intermediate compartments 104 of the same height (though shorter than that of the central compartment 102) located on each of two opposite sides of the central compartment 102, and a pair of lowest, rectangular, end compartments 106 of the same height (though shorter than that of the intermediate compartments 104), located at the ends of the planter 100 on each of two opposite sides of the intermediate compartments 104. With this laterally symmetrical, stepped arrangement of compartments 102–106, planter 100 appears as though it were a terraced garden, with terraces that descend on both sides of a hill.

FIGS. 7–11 show various other alternative geometries for respective planters 200–208 in accordance with the invention.

Figure 7:
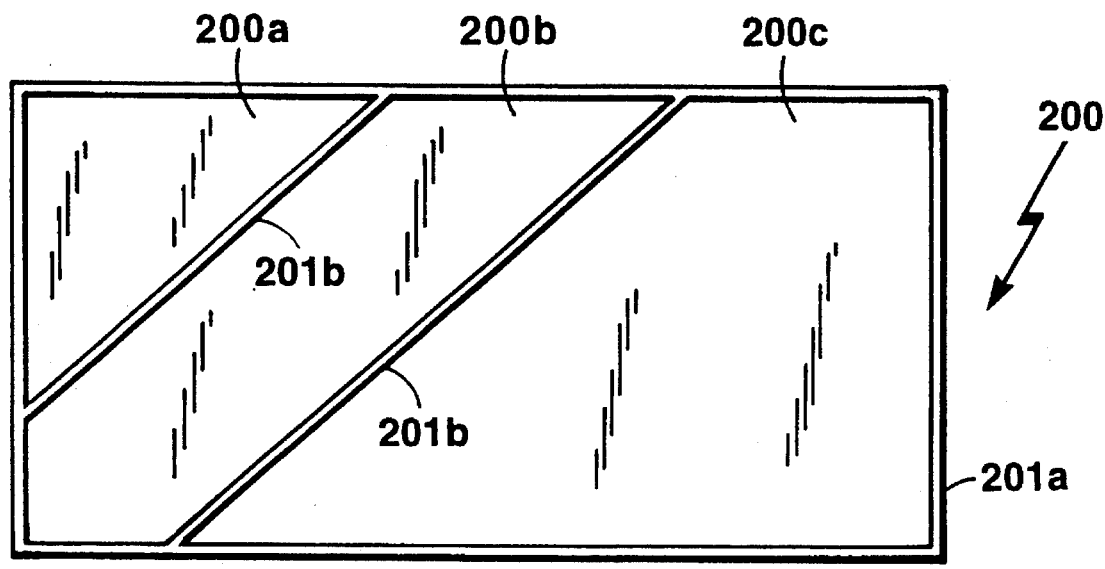
FIGS. 7 through 11 are top plan views of terraced planters in accordance with still other embodiments of the invention.

Planter 200 of FIG. 7 has a housing 201a of rectangular shape when viewed from the top, and planar partition walls 201b so as to form a highest, smallest, triangularly-shaped compartment 200a at one "corner", and successively shorter and larger compartments 200b, 200c toward the opposite corner.

Figure 8:
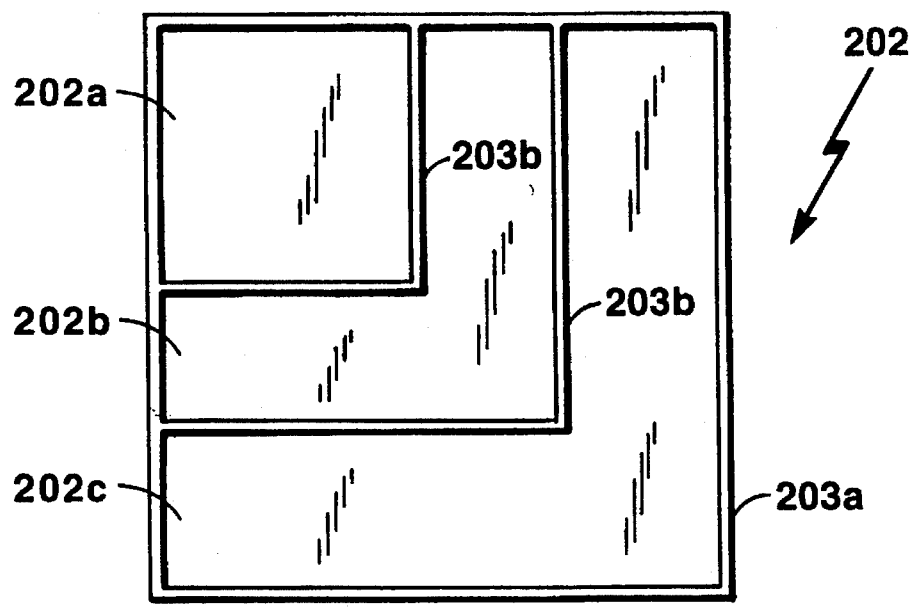

Planter 202 of FIG. 8 has a housing 203a of square shape when viewed from the top and "L" shaped partitions 203b so as to form a highest, square-shaped compartment 202a at one end, and successively shorter compartments 202b, 202c toward the opposite corner.

Figure 9:
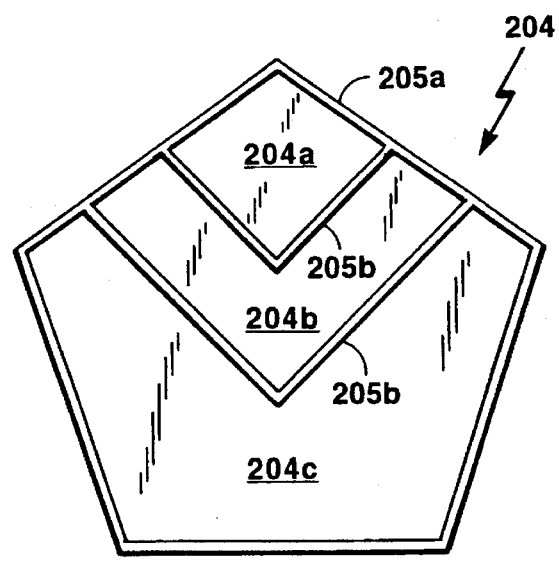

Planter 204 of FIG. 9 has a housing 205a of pentagonal shape when viewed from the top, and L-shaped partition walls 205b so as to form a highest compartment 204a at one "corner", and successively shorter compartments 204b, 204c thereabout.

Figure 10:
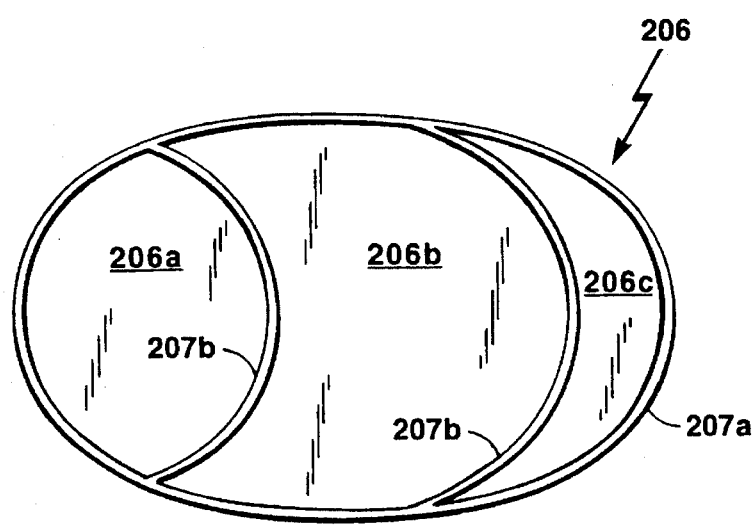

Planter 206 of FIG. 10 has a housing 207a of oval shape when viewed from the top, and arcuate partition walls 207b so as to form a highest compartment 206a at one end, and successively shorter compartments 206b, 206c toward the other end.

Figure 11:
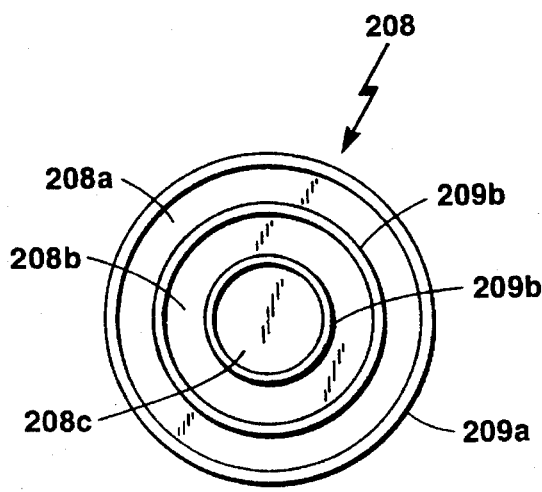

Planter 208 of FIG. 11 has a housing 209a of circular shape when viewed from the top, and concentrically disposed circular partition walls 209b so as to form a highest compartment 208c at the center, and successively shorter compartments 208b, 208a thereabout.

Thus, it will be seen that a terraced planter of novel design has been described. The advantages of the invention set forth herein are but some that can be realized; others will be apparent to those skilled in the art. The terms and expressions that have been employed herein are terms of description and not of limitation. In the use of such terms and expressions, there is no intention of excluding any equivalents of the features shown and described. It is recognized that various modifications are possible within the scope of the invention as claimed.

What is claimed is:

1. A portable and decorative planter for holding an arrangement of plants comprising:

a housing having a plurality of compartments defined by a plurality of partition walls intersecting a bottom wall, each said compartment being adapted to hold soil for growing one or more plants having similar soil and watering needs, said bottom wall having a descending rib extending about the perimeter of said bottom wall and a plurality of cross-ribs, each disposed beneath a respective partition wall;

a drip pan disposed under said housing for collecting water drained from the soil of each said compartment; and drainage means associated with each said compartment for allowing the soil drainage water to exit each said compartment and enter said drip pan.

2. The portable and decorative planter in accordance with claim 1, wherein said drip pan includes a bottom wall, an upstanding lip connected to said bottom wall and extending around the perimeter of said housing, and a plurality of stand-offs between said housing and said lip for providing a gap therebetween to permit evaporation of water from said drip pan.

3. The portable and decorative planter in accordance with claim 1, wherein said housing further comprises an outer wall connected orthogonally to said bottom wall, and wherein said descending rib and plurality of cross-ribs are disposed between said housing bottom wall and a bottom wall of said drip pan for establishing a space therebetween for collection of water.

4. The portable and decorative planter in accordance with claim 1, wherein each said compartment defines a plant bed at a selected height, and said height of said plant bed for each of said compartments is different, thereby providing a terraced planter.

5. The portable and decorative planter in accordance with claim 1, wherein said compartments include a first compartment having a first height, a second compartment having a second height that is less than that of said first compartment, and a third compartment having a third height that is less than that of said second compartment.

6. A terraced planter comprising:

an integrally-formed housing having a plurality of compartments defined by a plurality of partition walls intersecting a bottom wall, each said compartment holding soil for growing one or more plants having similar soil and watering needs, said bottom wall having a descending rib extending about the perimeter of said bottom wall and a plurality of cross-ribs, each disposed beneath a respective partition wall;

a drip pan disposed under a lower end of said housing for collecting water drained from the soil of each said compartment; and drainage means associated with each said compartment for allowing the soil drainage water to exit each said compartment and enter said drip pan;

wherein each said compartment comprises a first compartment having a first height, a second compartment having a second height less than that of said first compartment, and a third compartment having a third height less than that of said second compartment;

whereby said planter is terraced to enable a mix of plants having differing soil and watering needs to be grown together within separate ones of said compartments.

7. The terraced planter in accordance with claim 6, wherein said drip pan comprises a bottom wall, an upstanding lip connected to said bottom wall and disposed around said housing, and a plurality of stand-offs disposed between said lower end of said housing and said lip for providing a gap therebetween to permit evaporation of water from said drip pan, and said housing further comprises an outer wall connected orthogonally to said housing bottom wall, and wherein said descending rib and plurality of cross-ribs are disposed between said housing bottom wall and said bottom wall of said drip pan for establishing a space therebetween for collection of water.

8. The terraced planter in accordance with claim 6, wherein said housing and said first compartment are generally ovalular.

9. The terraced planter in accordance with claim 6, wherein said first compartment is in the middle of said housing, and said housing includes a plurality of said compartments on each side of said first compartment.

10. The terraced planter in accordance with claim 6, wherein said compartments are concentric.

11. The terraced planter in accordance with claim 6, wherein said partition walls are "L" shaped.

* * * * *